United States Patent
Black et al.

(10) Patent No.: US 11,474,620 B2
(45) Date of Patent: Oct. 18, 2022

(54) CONTROLLER INVERSION DETECTION FOR CONTEXT SWITCHING

(71) Applicant: Sony Interactive Entertainment Inc., Tokyo (JP)

(72) Inventors: Glenn Black, San Mateo, CA (US); Michael Taylor, San Mateo, CA (US); Javier Fernandez Rico, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/290,013

(22) Filed: Mar. 1, 2019

(65) Prior Publication Data

US 2020/0278759 A1    Sep. 3, 2020

(51) Int. Cl.
*G06F 3/0346* (2013.01)
*G06F 3/038* (2013.01)

(52) U.S. Cl.
CPC ............ *G06F 3/0346* (2013.01); *G06F 3/038* (2013.01); *G06F 2203/0384* (2013.01)

(58) Field of Classification Search
CPC .................. G06F 3/0346; G06F 3/038; G06F 2203/0384; A63F 13/843; A63F 13/424; A63F 13/87; A63F 13/493; A63F 13/213; A63F 13/211
See application file for complete search history.

(56) References Cited

U.S. PATENT DOCUMENTS

| | | | | |
|---|---|---|---|---|
| 8,228,292 | B1* | 7/2012 | Ruiz | G06F 1/1694 345/156 |
| 8,456,419 | B2* | 6/2013 | Wilson | G06F 3/038 345/158 |
| 8,556,721 | B2* | 10/2013 | Aronzon | A63F 13/42 463/39 |
| 8,698,745 | B2* | 4/2014 | Reams | H04N 21/42224 345/158 |
| 9,210,459 | B2* | 12/2015 | Ito | G06F 3/038 |
| 10,086,282 | B2* | 10/2018 | Mao | A63F 13/428 |
| 10,220,312 | B2* | 3/2019 | Aronzon | A63F 13/215 |
| 2006/0274032 | A1* | 12/2006 | Mao | A63F 13/212 345/156 |
| 2007/0218966 | A1* | 9/2007 | Tilston | A63F 13/10 463/5 |
| 2009/0303184 | A1* | 12/2009 | Tao | G06F 3/0231 345/163 |
| 2009/0322552 | A1* | 12/2009 | Machimura | H04N 5/4403 340/12.55 |
| 2010/0164993 | A1* | 7/2010 | Yoshida | G06F 3/03542 345/650 |
| 2011/0021269 | A1* | 1/2011 | Wolff-Peterson | A63F 13/85 463/29 |
| 2011/0025598 | A1* | 2/2011 | Underkoffler | G06F 3/0325 345/156 |

(Continued)

OTHER PUBLICATIONS

"International Search Report and Written Opinion", dated Apr. 8, 2020, from the counterpart PCT application PCT/US20/19386.

*Primary Examiner* — Grant Sitta
(74) *Attorney, Agent, or Firm* — John L. Rogitz

(57) ABSTRACT

A computer controller when in a normal orientation causes a first context of simulation play to be implemented. When inverted, the controller causes a second, different context of simulation play to be implemented.

21 Claims, 5 Drawing Sheets

(56) References Cited

U.S. PATENT DOCUMENTS

| | | | | |
|---|---|---|---|---|
| 2011/0025925 | A1* | 2/2011 | Hansen | G06F 3/0325 348/734 |
| 2011/0205156 | A1* | 8/2011 | Gomez | G06F 3/0346 345/157 |
| 2012/0050507 | A1* | 3/2012 | Keys | H04N 13/341 348/56 |
| 2012/0274863 | A1* | 11/2012 | Chardon | H04N 21/4222 348/734 |
| 2013/0141464 | A1* | 6/2013 | Hunt | G06F 3/0346 345/659 |
| 2013/0324243 | A1* | 12/2013 | Mikhailov | A63F 13/04 463/31 |
| 2014/0218290 | A1* | 8/2014 | Meijer | H01H 9/0214 345/158 |
| 2015/0015511 | A1* | 1/2015 | Kwak | G06F 1/3265 345/173 |
| 2015/0106851 | A1* | 4/2015 | Pauli | G06F 3/0386 725/44 |
| 2015/0182853 | A1* | 7/2015 | Weaver | A63F 13/98 463/31 |
| 2015/0277847 | A1* | 10/2015 | Yliaho | H04R 3/005 381/122 |
| 2015/0367234 | A1* | 12/2015 | Jones | A63F 13/23 463/31 |
| 2016/0349946 | A1* | 12/2016 | Koh | H04N 21/42209 |
| 2017/0206054 | A1* | 7/2017 | Wiggemans | G06F 3/162 |
| 2017/0329419 | A1* | 11/2017 | Dearman | G06F 3/011 |
| 2018/0034954 | A1* | 2/2018 | Yang | G06F 1/163 |
| 2018/0101238 | A1* | 4/2018 | Thomas-Brigden | H04N 21/637 |
| 2020/0009453 | A1* | 1/2020 | Tian | G06F 3/04815 |

* cited by examiner

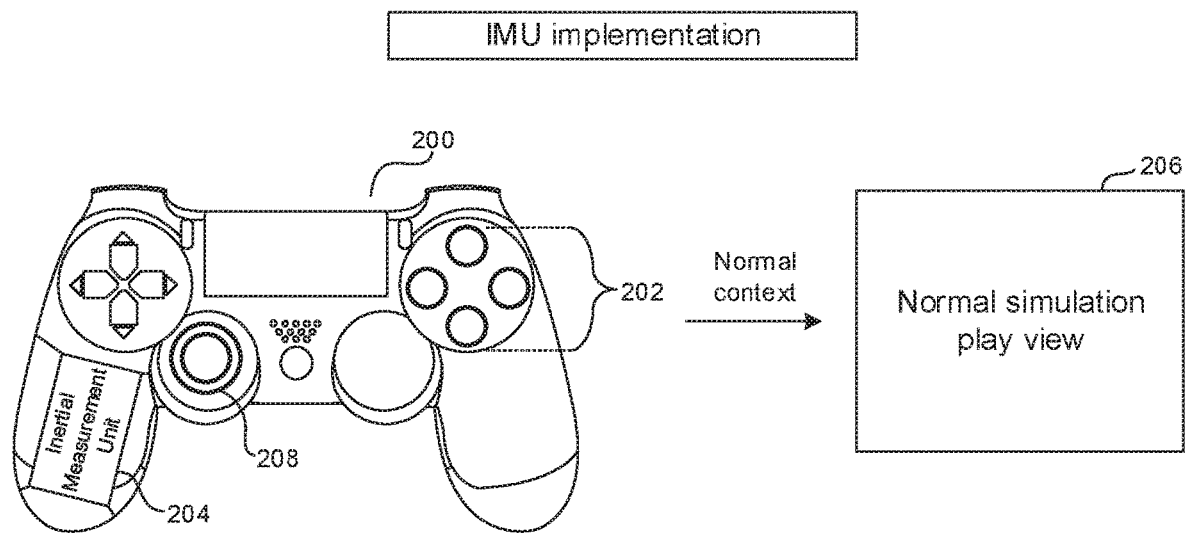
FIG. 2 Normal orientation
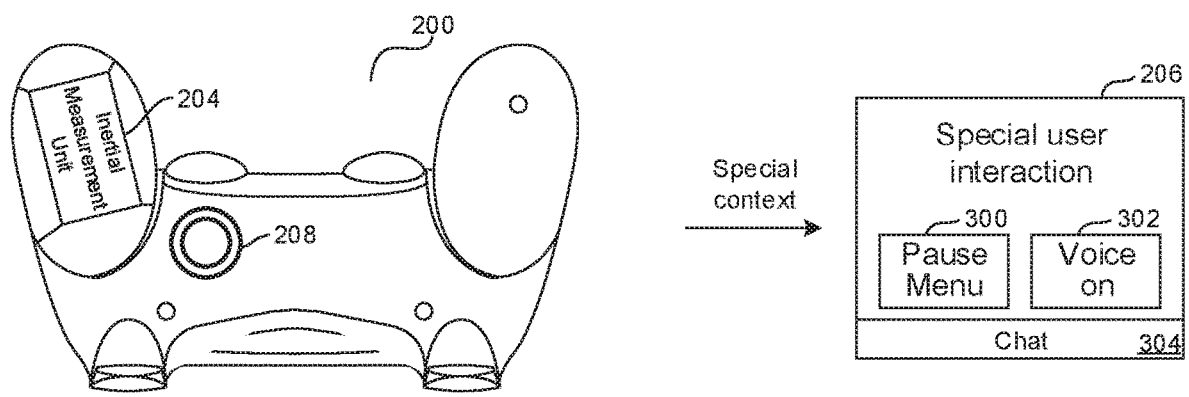
FIG. 3 Inverted orientation

Light bar implementation
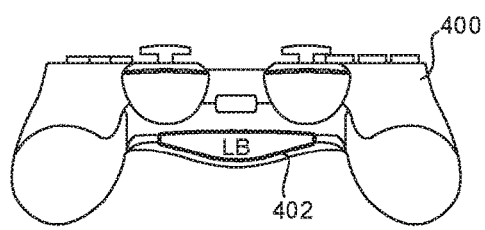
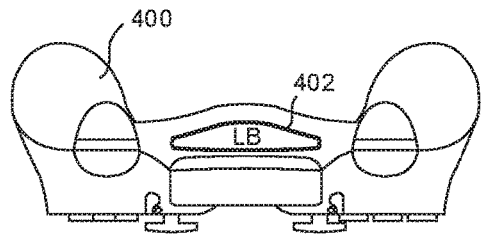
FIG. 4
Normal orientation
Normal context
FIG. 5
Inverted orientation
Special context
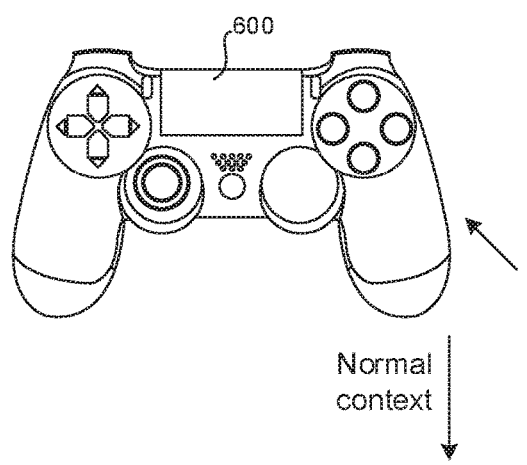
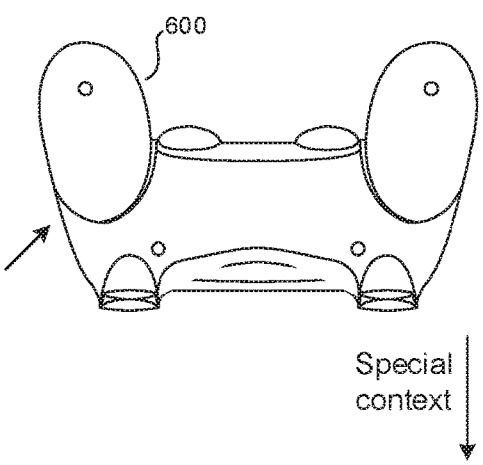
FIG. 6
Normal orientation
Normal context
FIG. 7
Inverted orientation
Special context
Tracking implementation

CONTROLLER INVERSION DETECTION FOR CONTEXT SWITCHING

FIELD

The application relates to computer simulation controller inversion detection for context switching.

BACKGROUND

Video simulation such as video gaming is growing in popularity. As understood herein, simulations are played with hand-held simulation controllers.

SUMMARY

Present principles understand that the functionality of simulation controllers may be expanded to provide additional simulation experiences.

Accordingly, a device includes at least one computer memory that is not a transitory signal and that in turn includes instructions executable by at least one processor to receive a first signal indicating a first orientation of a computer simulation controller. The instructions are executable to, based at least in part on the first signal indicating the first orientation, present a first context for a computer simulation associated with the computer simulation controller. The instructions are further executable to receive a second signal indicating a second orientation of a computer simulation controller and based at least in part on the second signal indicating the second orientation, present a second context for the computer simulation.

In example implementations the first orientation is a normally held orientation and the second orientation is an inverted orientation that is inverted from the normally held orientation. In some embodiments, the first and second signals are generated by at least one inertial measurement unit (IMU). In some embodiments, the first and second signals are generated based at least in part on a light bar associated with the computer simulation controller. In some embodiments, the first and second signals are generated based at least in part on tracking of the computer simulation controller.

In non-limiting examples, the second context includes at least one chat window presented on a display and the first context does not include at least one chat window presented on a display. In non-limiting examples the second context includes at least one pause menu presented on a display and the first context does not include at least one pause menu presented on a display. In examples, the second context is associated with voice input to at least one processor and the first context is not associated with voice input to at least one processor.

In some embodiments, the second signal indicates an inverted orientation and the instructions may be executable to, responsive to receiving the second signal, determine whether the computer simulation controller is being held by a person.

In another aspect, a system includes at least one computer simulation controller, at least one computer game console configured to present at least one computer simulation responsive to signals from the computer simulation controller, and at least one orientation sensing assembly configured to generate signals representing an orientation of the computer simulation controller. Responsive to signals from the orientation sensing assembly representing a first orientation of the computer simulation controller a first context of simulation play is implemented and responsive to signals from the orientation sensing assembly representing a second orientation of the computer simulation controller a second context of simulation play is implemented.

In another aspect, a method includes establishing a first context of play of a computer simulation based at least in part on a computer simulation controller being in a first orientation and establishing a second context of play of a computer simulation based at least in part on the computer simulation controller being in a second orientation.

The details of the present application, both as to its structure and operation, can best be understood in reference to the accompanying drawings, in which like reference numerals refer to like parts, and in which:

BRIEF DESCRIPTION OF THE DRAWINGS

FIG. 2 is a schematic diagram of a computer simulation controller consistent with present principles in a normal orientation for play of a simulation to control a simulation presented on a display, in an embodiment that uses an inertial measurement unit (IMU);

FIG. 3 is a schematic diagram of the computer simulation controller of FIG. 2 in an inverted orientation for play of a simulation;

FIG. 4 is a schematic diagram of a computer simulation controller consistent with present principles in a normal orientation for play of a simulation to control a simulation, in an embodiment that uses a light bar;

FIG. 5 is a schematic diagram of the computer simulation controller of FIG. 4 in an inverted orientation for play of a simulation;

FIG. 6 is a schematic diagram of a computer simulation controller consistent with present principles in a normal orientation for play of a simulation to control a simulation, in an embodiment that uses tracking;

FIG. 7 is a schematic diagram of the computer simulation controller of FIG. 6 in an inverted orientation for play of a simulation;

DETAILED DESCRIPTION

Figure 1:
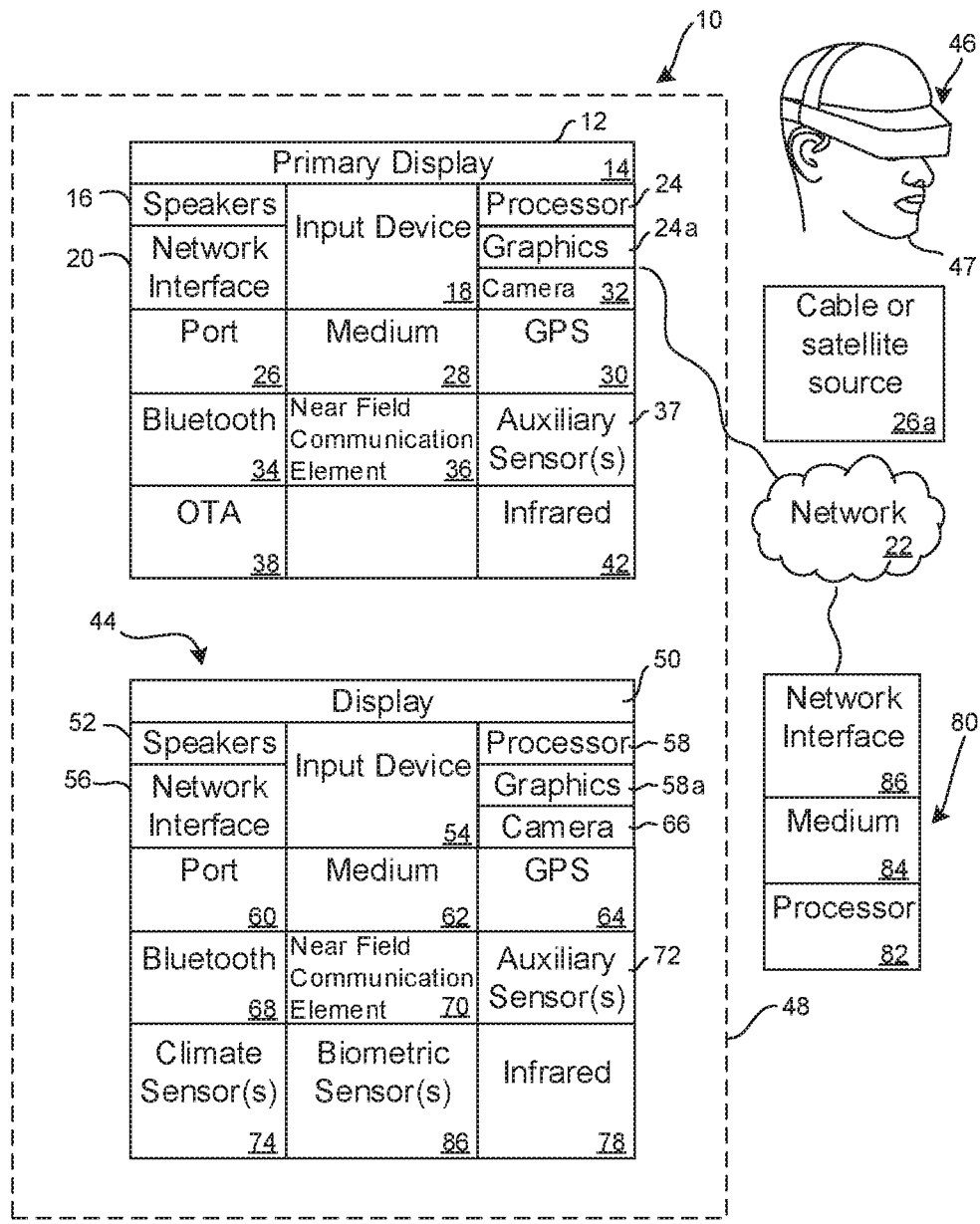
FIG. 1 is a block diagram of an example system including an example in accordance with present principles.

This disclosure relates generally to computer ecosystems including aspects of consumer electronics (CE) device networks such as but not limited to computer simulation networks such as computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Now referring to FIG. 2, a computer simulation controller 200 such as but not limited to a Sony PlayStation® game controller can be used to control presentation of a computer simulation such as but not limited to a computer game executed by a game console communicating with a display. The controller 200 may include any appropriate combination of components described above in reference to, e.g., the CE device 44 in addition to description below.

In the non-limiting example shown, in a normal orientation as shown in FIG. 2, multiple controller keys 202 are exposed for manipulation thereof by a simulation player. The controller 200 may include an inertial measurement unit (IMU) 204 such as a gyroscope, accelerometer, magnetometer, and combinations thereof. The IMU 204 generates a signal representing the orientation of the controller 200, such that the IMU 204 generates a first signal responsive to the controller 200 being in the normal orientation shown in FIG. 2 and a second signal responsive to the controller 200 being in a second orientation such as the inverted orientation shown in FIG. 3. In the example inverted orientation shown the controller keys 202 are not shown because they are on the underside looking down on the controller 200 in the inverted orientation. The controller 200 has been inverted by flipping the controller end-over-end front to back 180 degrees. The controller 200 may assume a second configuration that may be regarded as an inverted orientation by flipping the controller end-over-end left to right 180 degrees.

As set forth more fully below, based on the first signal indicating the normal orientation shown in FIG. 2, a first context for the computer simulation is established, which may include presenting a normal simulation view on a display 206. However, based on the second signal indicating the inverted orientation shown in FIG. 3, a second context for the computer simulation may be established. Without limitation, the second (inverted) context may include one or more of presenting a pause menu 300, enablement of voice input (which may be indicated as shown at 302 in FIG. 3) and opening a chat window 304. Or, responsive to being in one orientation voice chat may be implemented with only some but not all players (such as between only players of one "team" in a simulation), while responsive to the controller being in the other orientation voice chat may be implemented among every participant in the simulation.

FIGS. 2 and 3 also show that a joystick 208 may be implemented on the controller 200 that a user can "push through" the controller to pop up on other side in the inverted configuration, essentially a reversible joystick to provide for game control signal generation when the controller is inverted.

Thus, user interfaces (UI) may change depending on the simulation between the normal and inverted configurations. A word cloud may be implemented in which different areas on a virtual map can be represented in word cloud, which is presented for navigation on a display. An artificial intelligence (AI) system may use the word cloud and use thereof as input for future determinations. Word clouds are essentially conceptual diagrams of AI connections of one word to other possible, related words/subjects.

A "Word cloud" can be implemented by a pinwheel UI of options such as options for reviewing a simulation, rating a simulation, purchasing a new simulation from an online store, etc. For example, responsive to the controller being in the normal orientation, a UI may be presented in which a cursor may be placed over a UI element, and then when the controller is placed in the inverted orientation, data may be presented regarding how many hours and people play the simulation such that statistics, reviews, etc. are then presented in addition to selectors/menu options.

The inverted context may also include correlating physical motion of the controller 200 while inverted to select presented items on the display. "Triggers" to confirm, such as a prompt for the user to press a particular key to confirm. Or, a shaking of the controller may be used as a confirmation gesture. If the simulation is annotated to indicate most-likely actions, different menus for different parts of game may be implemented depending on the controller orientation. Yet again, inversion of the controller may pause the simulation, and/or give access to a main menu that can be presented on the bottom of screen, with other typical menus on top of the main menu.

FIGS. 4 and 5 illustrate an embodiment in which a controller 400 includes a light bar 402 on its housing, essentially a lamp. The light bar can be detected to derive the orientation of the controller, such that when the light bar 402 is closest to the player (FIG. 4) a normal orientation is indicated and when the light bar 402 faces away from the player (FIG. 5) an inverted orientation is indicated. The light bar may be imaged by a camera such as any of the camera described herein.

Indeed, FIGS. 6 and 7 illustrate that object recognition of a controller 600 may be obtained using images from a camera 602 to determine from object recognition whether the controller is in the normal orientation of FIG. 6 or the inverted orientation of FIG. 7. In some embodiments, both IMU and light bar tracking of orientation may be employed, IMU for orientation, and the light bar tracked by a camera on the simulation console for position/depth to facilitate three-dimensional gesture input such as using jabbing motions for simulation input. The camera may be on the controller itself, with the camera being enabled to generate images responsive to the orientation of the controller being inverted as indicated by the IMU.

Figure 8:
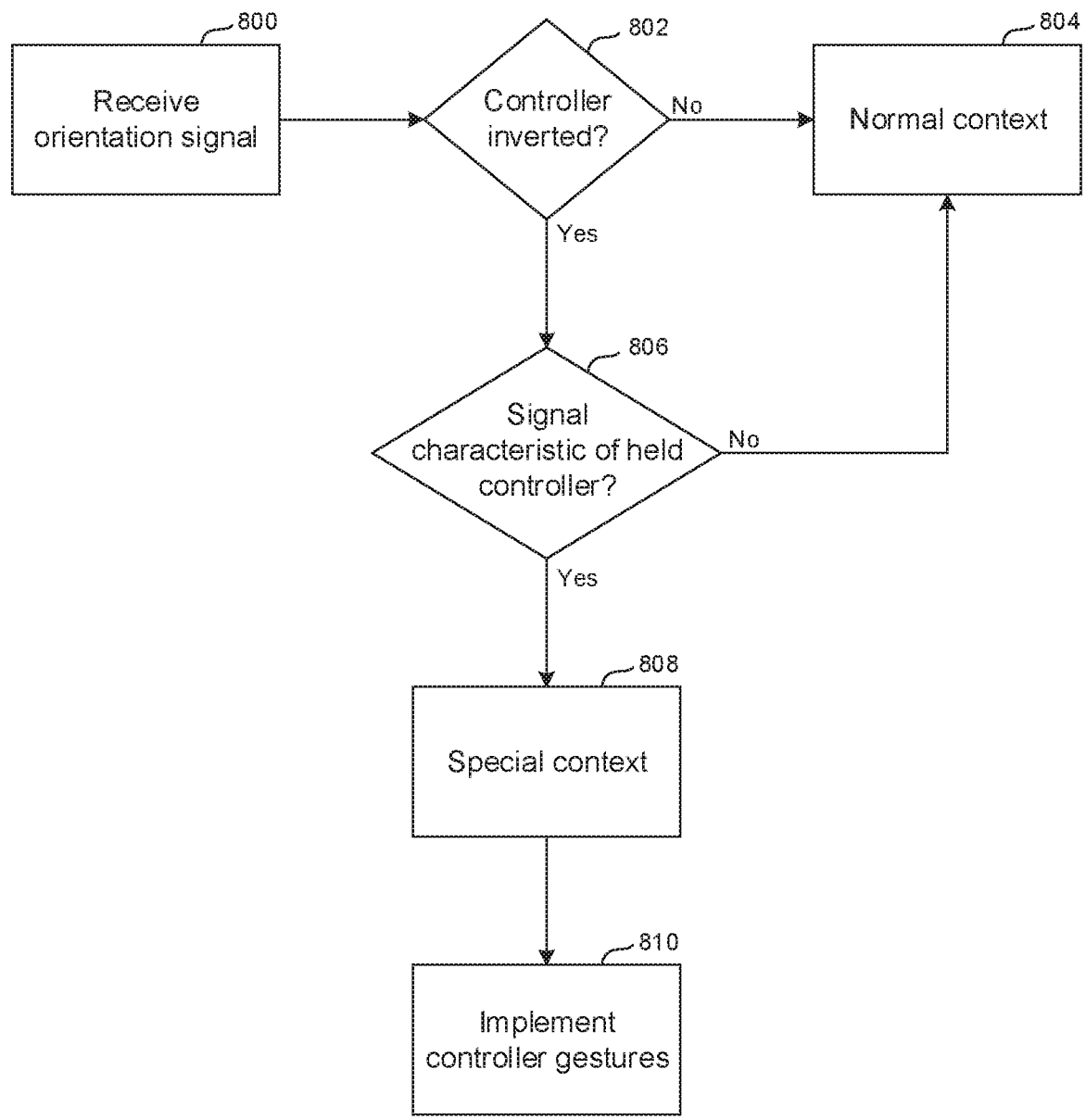
FIG. 8 is a flow chart of example logic consistent with present principles.

FIG. 8 illustrates logic consistent with the description above. Commencing at block 800 an orientation signal is received, e.g., from a camera and/or IMU. If the signal indicates that the controller is in the normal orientation at decision diamond 802, the logic presents the simulation in the normal context at block 804, essentially presenting the simulation as it would be presented without the capability of controller inversion described herein.

However, if it is determined at decision diamond 804 that the controller has assumed the second (e.g., inverted) configuration, the logic may move to decision diamond 806 to determine whether the signal includes characteristics of being held by hand and, thus, use inferred. This is to avoid implementing the special (inverted) context if the user simply lays the controller down to stop playing the simulation. A variety of orientation signal characteristics may be used to make the determination at decision diamond 806. For example, if there is no or little motion of the controller (motion below a threshold) or if there is no gravity vector/movement, the result at decision diamond 806 may be negative, and the logic may loop to block 804, whereas continued motion of the controller above a threshold may produce a positive result at decision diamond 806.

From decision diamond 802 when it is determined that the controller is inverted, if decision diamond 806 is not implemented, or from decision diamond 806 when a positive result is returned, the logic moves to block 808 to implement the special context described variously herein. If desired, the logic may move to block 810 to implement controller gesture input such as described herein.

Figure 9:
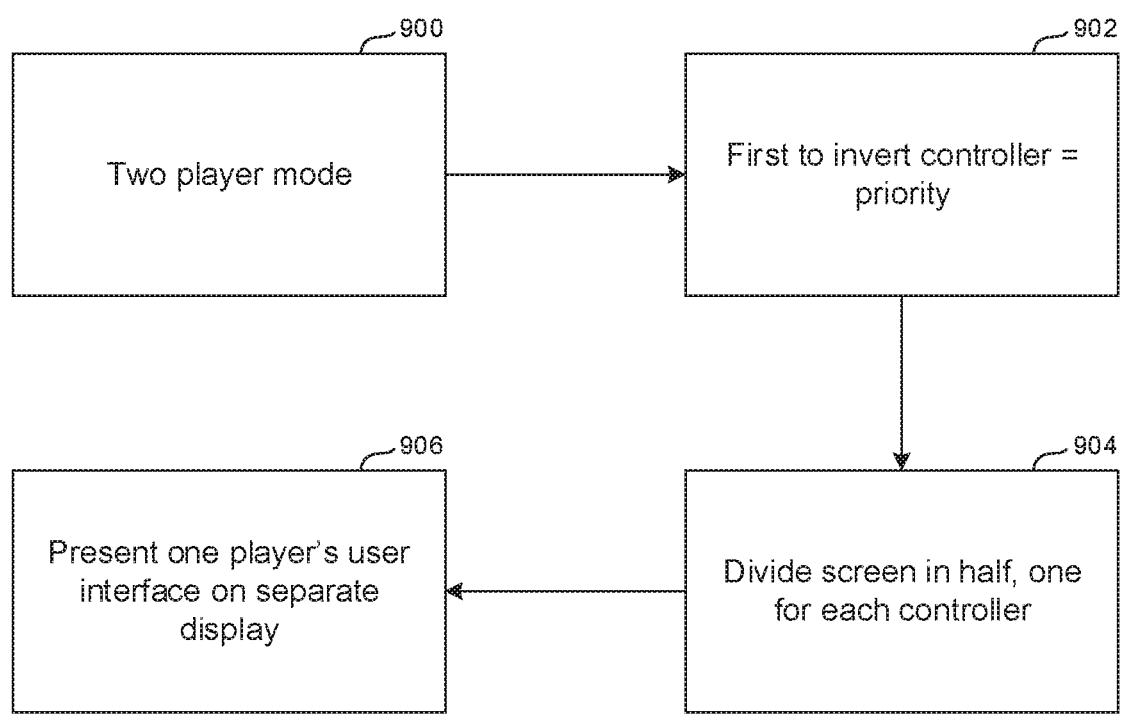
FIG. 9 is a flow chart of example two-player logic consistent with present principles.

FIG. 9 illustrates example logic for a two-player mode in which both players may flip their respective controllers to the inverted configuration to invoke the two-player mode at block 900. At block 902 it is determined which controller was the first one to be flipped to the inverted orientation, with the first-flipped controlled given priority of navigation input over the second controller if desired. Note that a registered user may be granted priority over a guest user regardless of who flipped the controller first.

In addition, or alternatively, the logic may move to block 904 to divide the screen presentation, e.g., in half, one for each controller such that navigation in one half of the presentation is controlled by one controller and navigation in the other presentation is half is controlled by the other controller, with different menus being presented in each half if desired.

Proceeding to block 906, if desired the UI of one of the users (such as the second-flipping user) may be moved from a primary display screen such as a TV, on which the first user's UI remains presented, to a separate display such as the display of a smart phone. The second user can continue to play using an application such as PlayStation Vita® on the other display while game is paused, or a menu is presented to first player on the primary display. Shifting presentation of the simulation from one display to another responsive to controller inversion may be used for a single user as well, so flipping the controller sends gameplay to another device.

When the controller is idle, it may be recalibrated with respect to orientation sensing when the IMU only is used. This may include obtaining a new gravity vector, etc.

It will be appreciated that whilst present principals have been described with reference to some example embodiments, these are not intended to be limiting, and that various alternative arrangements may be used to implement the subject matter claimed herein.

What is claimed is:

1. A device comprising:
at least one processor configured with executable instructions to:
receive a first signal indicating a first orientation of a computer simulation controller;
based at least in part on the first signal indicating the first orientation, present a first context for a computer simulation played on at least one display separate from the computer simulation controller and controlled by the computer simulation controller;
receive a second signal indicating a second orientation of a computer simulation controller; and
based at least in part on the second signal indicating the second orientation, present a second context for the computer simulation, wherein the first orientation is a normally held orientation and the second orientation is an inverted orientation that is upside down from the normally held orientation, wherein
the first context comprises voice chat implemented with a first number of players and the second context comprises voice chat implemented among a second number of players; and/or
the second context comprises at least one chat window presented on a display and the first context does not comprise at least one chat window presented on a display; and/or
the first context comprises a one player mode of the computer simulation and the second context comprises a two player mode of the computer simulation; and/or
the first context comprises a full screen mode and the second context comprises a half screen presenting two menus in respective halves of the display.

2. The device of claim 1, comprising at least one display device presenting the first and second contexts.

3. The device of claim 1, wherein the first and second signals are generated by at least one inertial measurement unit (IMU).

4. The device of claim 1, wherein the first and second signals are generated based at least in part on a light bar associated with the computer simulation controller.

5. A device comprising:
at least one processor configured with executable instructions to:
receive a first signal indicating a first orientation of a computer simulation controller;
based at least in part on the first signal indicating the first orientation, present a first context for a computer simulation played on at least one display separate from the computer simulation controller and controlled by the computer simulation controller;
receive a second signal indicating a second orientation of a computer simulation controller; and
based at least in part on the second signal indicating the second orientation, present a second context for the computer simulation, wherein the first orientation is a normally held orientation and the second orientation is an inverted orientation that is upside down from the normally held orientation, wherein
the first context comprises voice chat implemented with a first number of players and the second context comprises voice chat implemented among a second number of players; and/or
the second context comprises at least one chat window presented on a display and the first context does not comprise at least one chat window presented on a display; and/or
the second context comprises at least one pause menu presented on the display presenting the computer simulation under control of the controller and the first context does not comprise at least one pause menu presented on the display; and/or
the first context comprises a one player mode of the computer simulation and the second context comprises a two player mode of the computer simulation; and/or
the first context comprises a full screen mode and the second context comprises a half screen presenting two menus in respective halves of the display;
wherein the first and second signals are generated based at least in part on camera tracking of the computer simulation controller.

6. The device of claim 1, wherein the second context comprises at least one chat window presented on a display and the first context does not comprise at least one chat window presented on a display.

7. The device of claim 1, wherein the second context comprises at least one pause menu presented on a display and the first context does not comprise at least one pause menu presented on a display.

8. The device of claim 1, wherein the second context is associated with voice input to at least one processor and the first context is not associated with voice input to at least one processor.

9. A device comprising:
at least one processor configured with executable instructions to:
receive a first signal indicating a first orientation of a computer simulation controller;
based at least in part on the first signal indicating the first orientation, present a first context for a computer simulation played on at least one display separate from the computer simulation controller and controlled by the computer simulation controller;
receive a second signal indicating a second orientation of a computer simulation controller; and
based at least in part on the second signal indicating the second orientation, present a second context for the computer simulation, wherein the second signal indicates an inverted orientation and the instructions are executable to:
responsive to receiving the second signal, determine whether the computer simulation controller indicates continuing motion of the computer simulation controller; and
responsive to a determination of no continuing motion of the computer simulation controller, not establish the second context.

10. A system comprising:
at least one computer simulation controller;
at least one computer game console configured to present at least one computer simulation on at least one display responsive to signals from the computer simulation controller; and
at least one orientation receiver assembly of the computer game console configured to output to at least one processor of the computer game console signals representing an orientation of the computer simulation controller, wherein responsive to signals from the orientation sensing assembly representing a first orientation of the computer simulation controller a first context of simulation play output by the computer game console is implemented by the processor and responsive to signals from the orientation sensing assembly representing a second orientation of the computer simulation controller a second context of simulation play is implemented, wherein
the first context comprises voice chat implemented with a first number of players and the second context comprises voice chat implemented among a second number of players; and/or
the second context comprises at least one chat window presented on the display and the first context does not comprise at least one chat window presented on the display; and/or
the first context comprises a one player mode of the computer simulation and the second context comprises a two player mode of the computer simulation; and/or
the first context comprises a full screen mode and the second context comprises a half screen presenting two menus in respective halves of the display.

11. The system of claim 10, wherein the first orientation is a normally held orientation and the second orientation is an inverted orientation that is inverted from the normally held orientation.

12. The system of claim 10, wherein the orientation sensing assembly comprises at least one inertial measurement unit (IMU).

13. The system of claim 10, wherein the orientation sensing assembly comprises a light bar associated with the computer simulation controller.

14. The system of claim 10, wherein the second context comprises at least one chat window presented on a display and the first context does not comprise at least one chat window presented on a display.

15. The system of claim 10, wherein the second context comprises at least one pause menu presented on a display presenting the computer simulation and the first context does not comprise at least one pause menu presented on a display presenting the computer simulation.

16. The system of claim 10, wherein the second signal indicates an inverted orientation and responsive to receiving the second signal, a determination is made whether the computer simulation controller is being held by a person.

17. A method, comprising:
establishing a first context of play of a computer simulation presented on a display based at least in part on a first computer simulation controller that is separate from the display and that controls presentation of the computer simulation on the display being in a first orientation; and
establishing a second context of play of a computer simulation based at least in part on the first computer simulation controller being in a second orientation wherein the first context comprises voice chat implemented with a first number of players and the second context comprises voice chat implemented among a second number of players; and/or
the second context comprises at least one chat window presented on a display and the first context does not comprise at least one chat window presented on a display; and/or
the first context comprises a one player mode of the computer simulation and the second context comprises a two player mode of the computer simulation; and/or
the first context comprises a full screen mode and the second context comprises a half screen presenting two menus in respective portions of the display.

18. A method, comprising:
establishing a first context of play of a computer simulation presented on a display based at least in part on a first computer simulation controller that is separate from the display and that controls presentation of the computer simulation on the display being in a first orientation; and
establishing a second context of play of a computer simulation based at least in part on the first computer simulation controller being in a second orientation; and
establishing a view of the computer simulation on a secondary screen responsive to a second computer simulation controller being moved from the first orientation to the second orientation, wherein the secondary screen is not part of the display.

19. The device of claim 1, wherein the first context comprises voice chat implemented with a first number of players and the second context comprises voice chat implemented among a second number of players.

20. The device of claim 1, wherein the first context comprises a one player mode of the computer simulation and the second context comprises a two player mode of the computer simulation.

21. The device of claim 1, wherein the first context comprises a full screen mode and the second context comprises a half screen presenting two menus in respective portions of the display.

* * * * *